Figure 1:
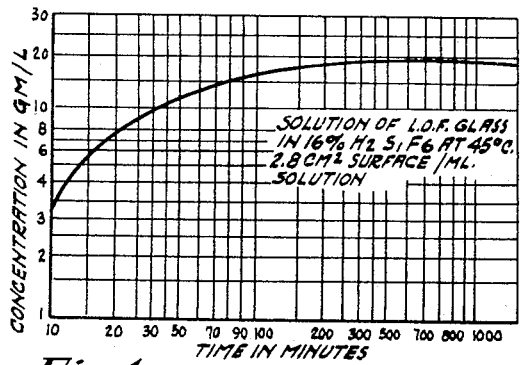

Nov. 1, 1949.  F. H. NICOLL ET AL  2,486,431
METHOD OF PRODUCING LOW-GLARE COATINGS
Filed Aug. 18, 1944

Inventor
FREDRICK H. NICOLL
FERD E. WILLIAMS
By
Attorney

Patented Nov. 1, 1949

2,486,431

UNITED STATES PATENT OFFICE 2,486,431

METHOD OF PRODUCING LOW-GLARE COATINGS

Frederick H. Nicoll and Ferd E. Williams, Princeton, N. J., assignors to Radio Corporation of America, a corporation of Delaware Application August 18, 1944, Serial No. 550,080

7 Claims. (Cl. 41—42)

1

This invention relates to methods of producing low-glare surfaces on glass or the like, and has for its principal object the provision of an improved low-glare surfacing process by which the object to be treated is immersed in a solution whereby predetermined elements of the treated surfaces are removed or leached out leaving a skeletonized film or surface of such thickness as to be low-reflective to light of a selected wave length.

As is well known in this art and as disclosed in the copending application of F. H. Nicoll, Serial No. 461,958, filed October 14, 1942, now Patent No. 2,461,840, dated February 15, 1949, the low reflective film preferably should have a thickness of the order of an odd number of quarter wavelengths of light of a selected wavelength.

Skeletonized silica films on glass have been produced heretofore by the use of hydrofluoric acid vapor and by the vapor of hydrofluosilicic acid. In this way, a large variety of glasses have been treated so as to reduce or eliminate reflection from the treated surface. It has been recognized for some time, however, that a solution method of treatment would have certain advantages not inherent in the acid vapor method of treatment. For example, the vapor method of coating usually produces a coating on only one surface while a solution method is readily utilized to coat all surfaces of the object. The solution method also involves no temperature differential between the solution and the object treated and is otherwise more readily practiced than some of the vapor processes heretofore used.

The invention will be better understood from the following description considered in connection with the accompanying drawings and its scope is indicated by the appended claims.

Figure 2:
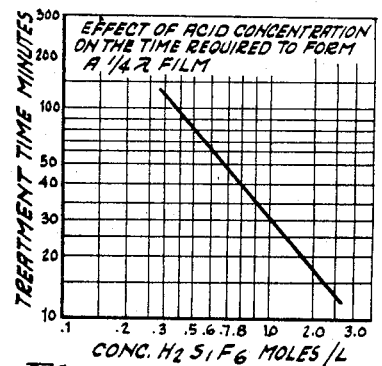
Figure 3:
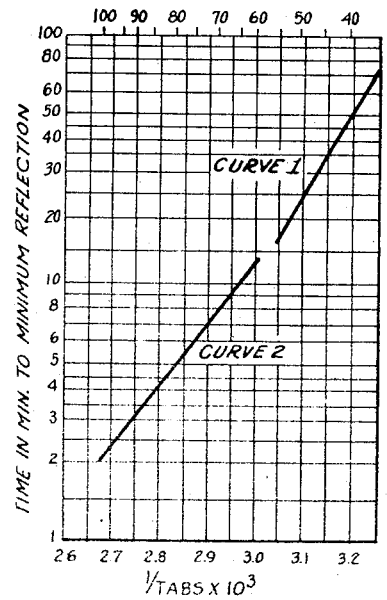

Referring to the drawings:

Figure 1 is a curve showing the variation in the amount of glass dissolved with the time that the glass is maintained in a 16% fluosilicic acid solution at 45° C., Figure 2 illustrates the effect of acid concentration on the time required to form a non-reflective coating of predetermined thickness, and Figure 3 is a pair of curves showing certain relations between temperature and the time required to produce a non-reflective coating.

The solution method of the present invention involves in general, a treating solution made by digesting or dissolving glass of the type to be treated in fluosilicic acid or the equivalent until the solution reaches a point such that it selectively removes the non-film forming constituents of the treated glass surface and produces a

2 skeletonized film or coating of the remaining constituents of the glass surface.

As applied to silica glasses, this means that silica glass, or its equivalent, is dissolved in fluosilicic acid ($H_2SiF_6$), that the non-siliceous constituents are differentially leached out or dissolved from the treated surface and that the resulting coating is skeletonized and altogether or largely constituted of silica.

Thus it is found, for example, that a solution suitable for producing a low index film on window glass and the like is made from 600 c.c. of 16% fluosilicic acid ($H_2SiF_6$) in which is maintained for fifteen hours at a temperature of 45° C. a piece of window glass having a total surface area of about three square feet.

The pieces of glass in the solution of fluosilicic acid plus glass are periodically examined and their characteristic appearance indicates the progress of formation of the final treating solution. These steps are as follows: Soon after placing the glass in solution the pieces are observed to have been strongly eaten away by the acid, but unlike the ordinary etching of glass with hydrofluoric acid, the surface still has a polished appearance. At this point, any glass protruding into the vapor arising from the solution will have a low reflection film on it. As the digestion of the glass continues the attack on the glass in solution becomes less and less film is formed in the vapor arising from the solution. As this condition is reached (after several hours), it is observed that a low reflection film is formed on the glass at the meniscus and in any "trapped volumes" (regions where two pieces of glass almost touch thus including a small volume of acid in contact with a large area of glass). These "trapped volumes" are the first regions to reach the correct conditions for producing low reflection films. When the time of digestion is further continued, the exposed surfaces of the glass begin to show interference colors but the reflection is still not low since the non-siliceous material is not yet completely removed and the film has an index of refraction probably around 1.4.

After a further period of digestion, the glass surface becomes more highly colored with corresponding indications of low refractive index in the surface film.

At this point, the undissolved glass is removed and the solution is ready for producing a low-reflecting film on a new piece of glass which is immersed in the solution at this point. Such a solution produces a film of low reflection to green light in about one-half hour. This film is on both sides of the glass and is satisfactory with respect to hardness and other mechanical properties.

The preparation of a treating solution as described is typical of the method in which glass is digested in an acid in order to bring about changes in the solution which will eventually produce a solution capable of selectively removing the non-siliceous parts of the glass. In general, tests performed on the glass at various times after mixing will give the results described above.

The method of preparing a treating solution may also consist of digesting glass in a mineral acid to which has been added a small quantity of hydrofluoric acid. The digestion of the glass surface goes through the various stages described above until satisfactory low index films are obtained. Low reflection films have been obtained using acids such as $H_2SO_4$, HCl, $HNO_3$, $H_3PO_4$, and also with salts of these acids. In each case it is essential that some HF be added. These acids even when hot will not produce low index films of low reflection on crown or lime glasses.

The mechanism of formation of the low index skeletonized film seems to depend on some action by the HF. This acid seems to remove enough silica so that the other mineral acid present is able to remove the non-siliceous component which, without the presence of HF, it would not be able to do to any great extent.

Still another method of preparing a treating solution is to mix a mineral acid with fluosilicic acid. As in the previously described cases, there is added to this mixture either dissolved glass of the nature desired to be given low reflection properties, or, stated in different terminology, the ingredients which it is desired to retain on the low-reflective glass surface. As in the previous cases mentioned, this would involve for silica glass, the addition of silica, and sodium and calcium ions.

The digestion of the glass in the acid solutions appears to be merely a method of altering pH and fluoride ion concentration and in addition the amount of salts in solution. These two quantities will not be the same for treating different glasses but a solution being prepared by glass digestion will, after a certain length of time treat one type of glass whereas further digestion may be necessary to reach the point at which another type of glass can be treated. Thus, for example, a solution of lead glass digested in fluosilicic acid reaches at some later time a condition in which it will satisfactorily treat lime glass.

The necessity for dissolving in the solution glass of the type which is to be coated may be avoided if the solution is made to have the desired constituents by dissolving the required ingredients in it. Thus, a solution suitable for treating silica glass is made by dissolving in fluosilicic acid, silica and sodium and calcium fluosilicates.

Fig. 1 shows the variation in the amount of glass dissolved with the time that the glass is in a 16% fluosilicic acid solution at 45° C. The velocity of a liquid-solid interface reaction can be expressed in the following form.

$$\frac{dc}{dt} = k'(a-c)^n$$

where $a$ = the solubility of the solid in the liquid
$c$ = the concentration of the solute in the solution at time, $t$
$n$ = the order of the reaction By graphical differentiation of the curve of concentration of dissolved glass versus time of immersion and plotting log $$\frac{(dc)}{dt}$$

against log $(a-c)$, the process of solution has been found to be best described as a second order reaction, particularly if the solubility of the glass in the acid is taken as 24 mg./ml. Actually, the order of the reaction appears to be changing with time, especially when the solution approaches saturation. This indicates that the actual mechanism of solution is changing with the amount of dissolved glass. After 15 hours the mechanism has sufficiently changed so that silica is no longer being dissolved as rapidly as the metal oxides, and a silica film results. At this stage, the 16% fluosilicic acid solution contains approximately 20 mg. of glass per ml. of solution. From chemical analysis of the actual glass dissolved about 63% (12.5 mg.) is silica and about 37% (7.5 mg.) are metal oxides.

The time required to form a quarter wave film was determined as a function of acid concentration. From the results shown in Fig. 2, it is apparent that the process of film formation is a second order reaction. This confirms the less direct measurements made on the fluosilicic acid vapor process. As also shown in this figure, the time required to form a $$\frac{\lambda}{4}$$

film decreases with increase in concentration of the fluosilicic acid.

The fluosilicic acid vapor process is not suitable for use at other than room temperature. This is not the case for a solution process. Most of the work on the fluosilicic acid solution method has been done at 45° C. as a matter of convenience of experiment and because of the relatively short time required to make a quarter-wave film. For example, above 50° C. ceresin wax containers melt and above 55° C. the Harvel insulating varnish used shows evidence of attack in the vapor process by 16% fluosilicic acid. Therefore, in investigating the process as a function of temperature, a platinum distillation flask of 100 ml. capacity was used. A 16% solution prepared at 45° C. was found to produce low-index films between 35° C. and 55° C. Below 35° C. the solution failed to attack the glass at all, whereas above 55° C. the solution removed glass uniformly and produced only a narrow film at the meniscus.

The temperature dependence of the time required to make a quarter-wave film is shown by curve 1 in Figure 3. The heat of activation of the process of film formation can be calculated from this curve and is found to be the same as the heat of activation for film formation by the vapor process.

$$\Delta H = R \frac{d(\ln t)}{d(1/T)} = 15.1 \ K \ cal.$$

One way of preparing a solution to treat glass above 55° C. is to add alkali solution to the 16 percent fluosilicic acid working solution prepared at 45° C. The following table gives the volume of 10 N NaOH required to make 100 ml. of the 45° C. solution work at the specified temperature. The time to produce a quarter-wave film is also included. In most cases the solution was tested by making a film within an hour after the alkali addition, and the resulting films were not always completely uniform.

| Temperature | Vol. 10 N NaOH | Time |
|---|---|---|
| °C. | Ml. | Min. |
| 60 | .2 | 13 |
| 65 | .4 | 10.5 |
| 70 | .8 | 8.5 |
| 75 | 1.2 | 6.5 |
| 80 | 1.6 | 5 |
| 85 | 2.6 | 4 |
| 90 | 5.2 | 3 |
| 95 | 7.0 | 2.5 |
| 100 | 8.5 | 2 |

The time to produce a quarter-wave film is also shown by curve 2 of Figure 3. The slope of this curve is not a measure of the heat of activation because the acid concentration is being decreased with increasing temperature since NaOH has been added at each experimental point. It is interesting to note that if curve 1 is continued to 100° C. the time of treatment would be one minute. At 100° C. curve 2 indicates two minutes and it can be calculated from the amount of alkali added that about half the fluosilicic acid has been changed to fluosilicate at this temperature. This agrees with the previous results shown in Figure 2 that the time of treatment varies inversely with acid concentration. Also, it can be concluded that the heat of activation and therefore the mechanism are independent of temperature.

During the treatment, the glass is supported at any convenient point in the liquid but not touching the bottom of the container or the surface of the liquid. A satisfactory means of support is a cradle or framework touching only the edges of the treated glass.

The temperature of the solution during treatment of the glass is not critical. Good non-reflective films have been made at 100° C. in one or two minutes. Evaporation of the solution at this temperature and the difficulty of finding sufficiently rugged containers, however, make it desirable to operate at a lower temperature of the order of 65° C., for example.

We claim as our invention:

1. The method of forming on the surface of a silica glass object a low-reflectance skeletal film consisting essentially of silica and having a thickness of the order of an odd number of quarter wave lengths of light, said method comprising dissolving in a solution including fluosilicic acid about 20 mg. per ml. of a soda-lime-silica glass, said dissolved glass comprising about 63 per cent silica and about 37 per cent metallic oxides and immersing said object in said solution until said low-reflectance film is formed.

2. The method of claim 1 in which there is also present in said solution a mineral acid.

3. The method of forming on the surface of a silica glass object a low-reflectance skeletal film consisting essentially of silica and having a thickness of the order of an odd number of quarter wave lengths of light, said method comprising dissolving in a solution including a mineral acid and a minor amount of hydrofluoric acid about 20 mg. per ml. of a soda-lime-silica glass, said dissolved glass comprising about 63 per cent silica and about 37 per cent metallic oxides and immersing said object in said solution until said low-reflectance film is formed.

4. The method of forming on the surface of a silica glass object a low-reflectance skeletal film consisting essentially of silica and having a desired thickness of the order of an odd number of quarter wave lengths of light, said method comprising immersing partially in a solution including fluosilicic acid a piece of a silica-containing glass, continuing said immersion until there is formed on a surface of said glass protruding above said solution a film having said desired thickness, removing the glass thus treated, immersing in said solution a fresh piece of a silica-glass, and continuing said last immersion until said fresh piece of glass has acquired a low reflectance surface film having said desired thickness.

5. A method according to claim 4 in which said last mentioned glass is a soda, lime glass.

6. A method according to claim 4 in which said solution also contains a mineral acid.

7. In the production of a low-reflectance skeletal film consisting essentially of silica and having a desired thickness of the order of an odd number of quarter wave lengths of light, said method comprising immersing partially in a solution comprising a mineral acid and a minor proportion of hydrofluoric acid a piece of a silica-containing glass, continuing said immersion until there is formed on a surface of said glass protruding above said solution a film having said desired thickness, removing the glass thus treated, immersing in said solution a fresh piece of a silica-containing glass and continuing said immersion until said fresh piece of glass has acquired a low reflectance film having said desired thickness.

FREDERICK H. NICOLL.
FERD E. WILLIAMS.

REFERENCES CITED

The following references are of record in the file of this patent:

UNITED STATES PATENTS

| Number | Name | Date |
|---|---|---|
| 1,997,375 | Naruse | April 9, 1935 |
| 2,129,071 | Rowell | Sept. 6, 1938 |
| 2,220,862 | Blodgett | Nov. 5, 1940 |
| 2,337,460 | French | Dec. 21, 1943 |
| 2,348,704 | Adams | May 16, 1944 |
| 2,369,741 | Jones et al. | Feb. 20, 1945 |
| 2,370,214 | Walker | Feb. 27, 1945 |

FOREIGN PATENTS

| Number | Country | Date |
|---|---|---|
| 102,412 | Australia | 1937 |

OTHER REFERENCES

Watts: Dictionary of Chemistry, vol. 2, 1889, pub. Longmans, Green & Co., N. Y. C., page 559.

Mellor: Treatise on Inorganic Chemistry, volume VI, page 942, pub. Longmans, Green and Co., 1925.